United States Patent [19]

Cheatham et al.

[11] 4,287,540

[45] Sep. 1, 1981

[54] STABILIZED RECORDING

[75] Inventors: Samuel D. Cheatham, Arvada, Colo.; Munro K. Haynes, Tucson, Ariz.

[73] Assignee: International Business Machines Corporation, Armonk, N.Y.

[21] Appl. No.: 101,349

[22] Filed: Dec. 7, 1979

[51] Int. Cl.³ .......................... G11B 5/02; G11B 5/25
[52] U.S. Cl. ...................................... 360/18; 360/77; 360/119
[58] Field of Search ..................... 360/18, 20, 77, 121, 360/66, 122, 119, 57

[56] References Cited

U.S. PATENT DOCUMENTS

| | | | |
|---|---|---|---|
| 3,032,612 | 5/1962 | Goldmark | 360/66 |
| 3,816,850 | 6/1974 | Otsuka et al. | 360/57 |
| 3,838,446 | 9/1974 | Otsuka et al. | 360/66 |
| 4,149,204 | 4/1979 | Marino et al. | 360/121 |
| 4,180,835 | 12/1979 | Okummura et al. | 360/121 |

Primary Examiner—Vincent P. Canney
Attorney, Agent, or Firm—Herbert F. Somermeyer

[57] ABSTRACT

A first signal to be stabilized in a magnetic record member is recorded via a head having a given maximal gap length and pole pieces of high saturation induction. After the first signal is recorded, the magnetic record member is surface erased for stabilizing the just recorded signal. In a preferred form, the surface erasing is performed by AC erasing via a transducer having a gap length less than said maximal gap length. The pole pieces of the erasing head need not have the high saturation induction of the first mentioned head. After such stabilization, signals can be easily recorded and recovered from the magnetic record member by using transducers with gap lengths less than such given maximal gap length and using the normal ferrite heads having a lower saturation induction than the first mentioned heads. The first signal can be advantageously employed as a position indicating signal in a magnetic record member, such as a storage disk or tape. The first signal can also be used for other purposes, such as phase control for recording and in a controlled access or security system.

3 Claims, 10 Drawing Figures

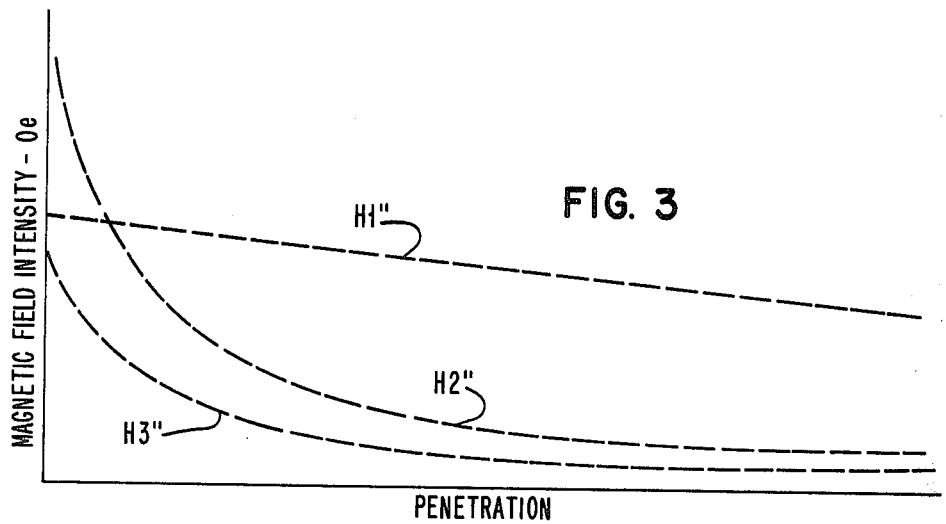
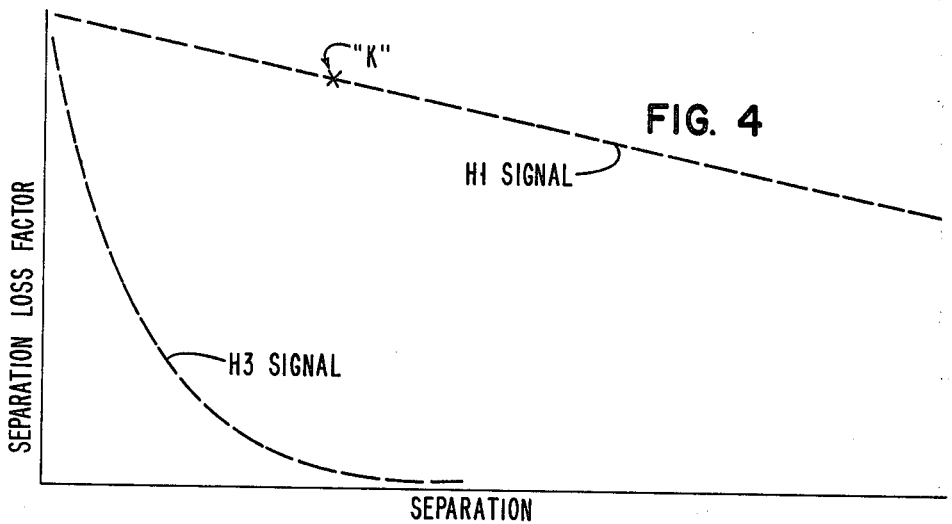
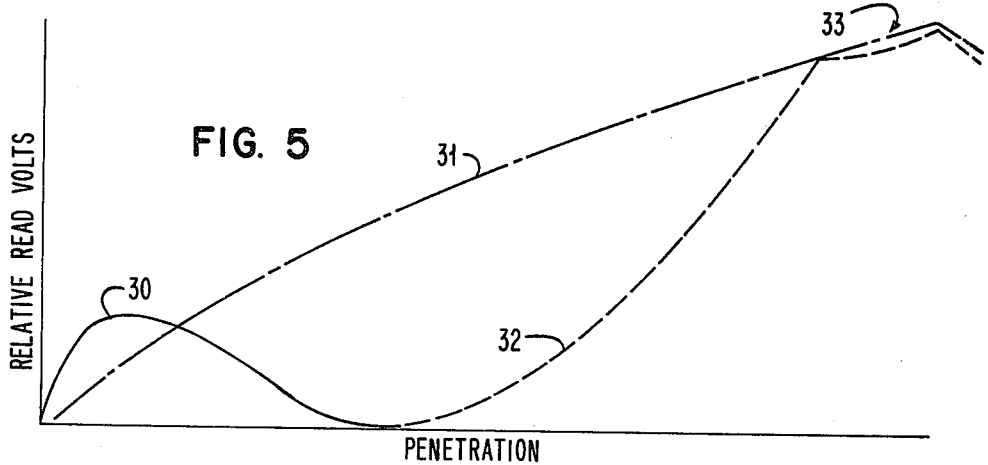

STABILIZED RECORDING

BACKGROUND OF THE INVENTION

The present invention relates to magnetic recording and more particularly to a method and apparatus for stabilizing a recorded signal such that other signals can be recorded and written without degrading the stabilized signal.

Magnetic recording, particularly digital signal recording, has been becoming increasingly complicated. Continuing advances have been made in achieving greater linear densities, as well as higher track densities. A recording device designer is now being faced with ever increasing important problems for achieving and reliably building high performance recorders, particularly of the digital type. For example, as track density increases, track seeking and following become increasingly more difficult. Similarly, as linear densities increase, inter-symbol interference becomes more of an acute problem. All of the above problems reach an apex of difficulty when flexible media is used as a record member.

Flexible media in particular require a relatively thick magnetic coating for containing the signal to be recorded. This requirement increases inter-symbol interference problems, particularly at higher linear and track densities. Equalization techniques are used widely for accommodating these problems.

Location of track or track identification techniques at higher track densities also becomes a serious problem. Sector servos, that is, sector or position indicating signals, are interleaved with data signals to indicate the precise location of the data tracks. Sector servo signals reduce the data storing capacity of a record member and therefore becomes expensive. To circumvent the loss of data storing area on a record member, a so-called "buried-servo" has been desired in that the data and the servo then can underlie the same surface area; the servo or position indicating signals ideally occupy a lower portion of the magnetic coating while data signals occupy an upper portion of the magnetic coating directly over the servo signals. A serious problem arises in that when the data signals are repeatedly recorded and reproduced, there has been degradation of the so-called buried servo signal; that is, as more and more data is recorded and retrieved, the signal amplitude of the servo signal gets smaller; this variation makes the system less reliable. In fact, this change occurs at a relatively rapid rate.

Also, in handling high density recording overwriting without erasing is desired. Overwriting in digital records results in certain distortions which can be at least partially solved by the addition of AC bias. However, means are still needed for ensuring that the "buried signal" does not decrease with usage; i.e., it needs to be stabilized.

Further, such "buried" signal can be used for controlling the timing of the recorder for enhancing operation at extremely high linear densities. Unfortunately, to date, no system has been devised for carrying out stabilization of such a signal without having two different coercivity layers of magnetic material. The use of two coercivity layers of magnetic material in a record member greatly increases the cost of the record member. Accordingly, it is desired to provide a stabilized signal in a substantially homogeneous magnetic layer.

Further, in magnetic tape art, an erase gap often precedes a read/write gap. Generally the erase gap has a greater length than the subsequent read/write gap. This gap relationship ensures that the erasing is effective to clear the tape for preventing intermodulation and interference effects in the magnetic layer. However, in reading or sensing signals, a long gap length causes increased energy loss called "gap loss". As a result, greater equalization and improved detection techniques are required to compensate for a lower signal to noise ratio in the signal recovered from the record media. Accordingly, when reading signals, long gaps are avoided for the above reasons. For high frequency recording, a ferrite pole is usually selected for heads for reducing eddy current losses. Unfortunately, the ferrite pole piece has a low saturation induction which limits the capability of the head to write deep into the magnetic medium.

SUMMARY OF THE INVENTION

An object of the invention is to provide methods and apparatus for stabilizing a recorded signal residing in a relatively deep portion of a magnetic layer.

In accordance with the invention, a first signal to be stabilized is magnetically recorded in a layer of magnetic material using a gap length of first predetermined length. The layer is then surface erased. As one method of surface erasing, an AC signal having frequency components higher than frequency components of the first signal erases a surface portion of the layer. Subsequent recording in the layer is achieved with gap lengths sorter than said first predetermined length to thereby not affect the stabilized first signal magnetic remanence in such magnetic layer.

The foregoing and other objects, features and advantages of the invention will be apparent from the following more particular description of preferred embodiments of the invention, as illustrated in the accompanying drawings.

THE DRAWINGS

Figure 1:
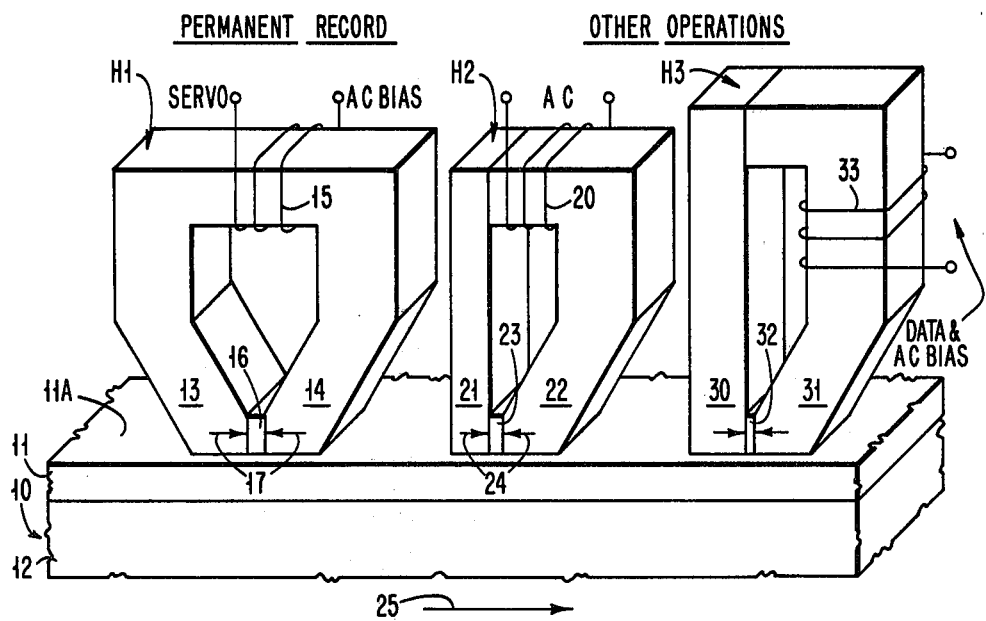
FIG. 1 is a diagrammatic showing of the principles of the present invention.
Figure 8:
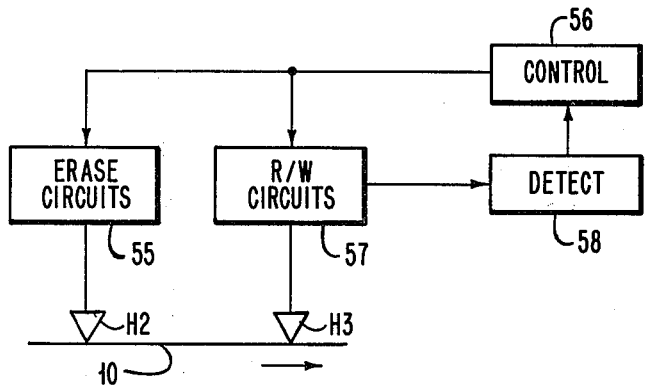
Figure 9:
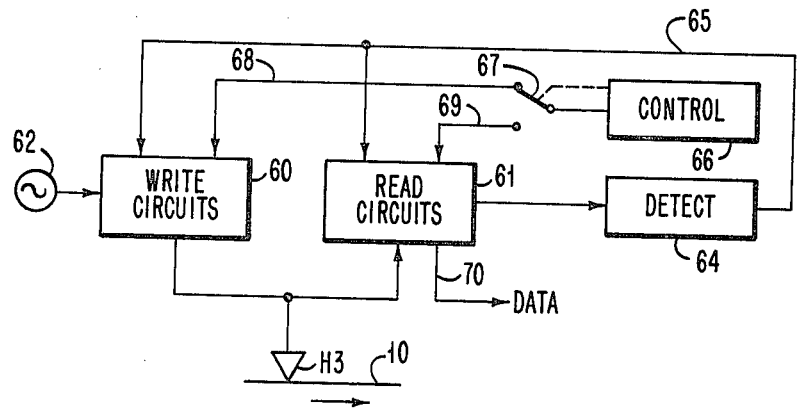
Figure 10:
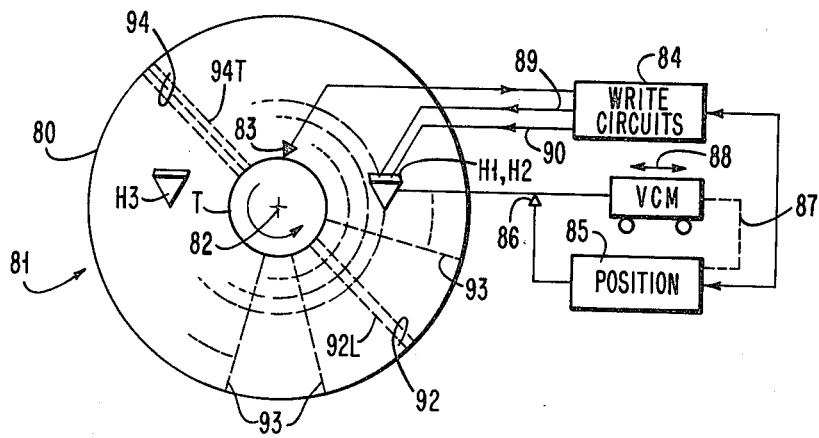

FIGS. 3-5, inclusive, show calculations of behavior of the FIG. 1 illustrated apparatus;

FIGS. 6-9 diagrammatically illustrate in simplified form various apparatus employing the teachings of the present invention; and FIG. 10 is a diagrammatic showing of a disk recorder which advantageously employs the invention as a buried servo in a record medium.

DETAILED DESCRIPTION

Referring now more particularly to the drawings, like numerals indicate like parts and structural features in the various diagrams. FIG. 1 illustrates the fundamental operational principles of the present invention. The invention achieves the recording of a stabilized signal in a magnetic medium 10 having a magnetic coating such as an iron oxide, a chromium oxide, a plated magnetic material or the like; on a suitable substrate 12. In the illustrative embodiment of the invention, coating 11 can be iron oxide or chromium oxide on a flexible polyester substrate 12, no limitation thereto intended. The signal to be stabilized in magnetic coating 11 is recorded via head H1. Head H1 preferably has material exhibiting high saturation induction in its pole pieces 13, 14; such as mu metal. A suitable winding 15 couples a first electric signal to pole pieces 13, 14 for recording the first electric signal in coating 11, as is well known. A significant difference from usual servo data signal recording is the length of gap 16, as indicated by the opposed arrows 17. The length of gap 16 has a length greater than any gap length to be used for all subsequent signal recording expected with respect to magnetic record medium 10. Such longer gap length causes the magnetic flux to penetrate more deeply into record medium 10 to provide magnetic remanence of greater strength than from a shorter gap and weaker signal throughout substantially all of the medium 10 thickness. In one example, gap 16 had a length of 5 micrometers, a mu metal head was used in connection with a low coercivity medium, such as gamma ferrous oxide. A first-recorded signal to be stabilized was recorded having a lineal density of 393.5 flux changes per centimeter.

After recording the first signal to be stabilized, all subsequent magnetic recording operations use heads, such as heads H2, H3, having shorter gap lengths than the gap 16 length. These heads can also use low saturation head material, such as nickel-zinc ferrite (which is desirable for high signal frequencies).

Figure 2:
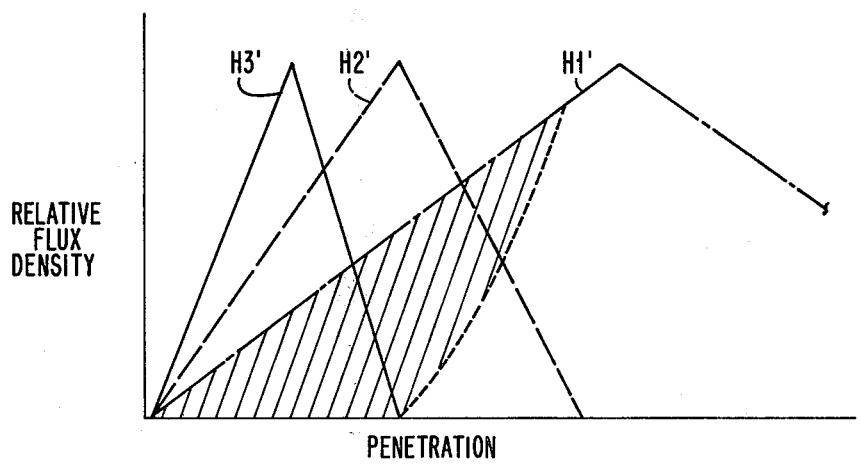
FIG. 2 is a graphical representation in diagrammatic form of remanent magnetization based upon the FIG. 1 diagrammatic showing.

In a best mode for recording the signal to be stabilized, it is desired to select a longer gap length than used for data signal recording, such as 5.25 micrometers. The advantage of such longer gap enables the selection of nickel-zinc ferrite for pole pieces 13, 14 while still enabling the recording at a signal to be stabilized (preferably ac biased) of a 400 Oersted coercivity tape to at least a 50 micrometer depth. The effect of greater length gap 16 on depth of magnetic flux penetration into magnetic coating 11 is shown in FIG. 2 by line H1'.

It must also be borne in mind that recording using such shorter gap lengths will still erase a portion of the recorded servo signal adjacent the coating surface 11A. If such erasure is not controlled, then there could be a chnage in output from the "servo" signal. For stabilizing these first recorded signals, a surface erasure is performed immediately after the greater length gap recording or at some time prior to recording additional information bearing signals, such as digital data signals. Such surface erasure is achieved by AC erasing an upper portion of coating 11 under surface 11A. While such AC surface erasing can be achieved with a read/write head on a magnetic recorder, this arrangement could be inconvenient and not necessarily ensure that each and every record medium has been surface erased. Accordingly, it is preferred that surface erasure occur immediately after deeply recording the signal to be stabilized. Such immediate stabilization can be achieved by placing record medium 10 in a separate recorder, or with a separate head in the same recorder that recorded the signal to be stabilized or by using a dual gap head, one gap being of greater length and the second gap being substantially shorter for enabling the AC surface erasure.

In FIG. 1, head H2 diagrammatically represents that portion of a dual gap head for providing surface erasure in coating 11. Head H2 can also be a separate head assembly. An AC bias signal is supplied via winding 20 to the head pole pieces 21, 22 for recording via short gap 23. Gap 23 has a gap length indicated by the opposing arrows 24. Record medium 10 is transported in the direction of arrow 25 by usual record transport apparatus. The effect of the AC erasure is shown in FIG. 2 by the H2'. The effective erasure of the signal to be stabilized, is illustrated in the hatched area. When using a 12.5 micrometer greater gap 16 length, the gap length of AC erase gap 23 can be approximately 1 micrometer.

The recording of additional information-bearing signals, such as digital data signals, is subsequently achieved via a head H3 having ferrite pole pieces 30, 31 separated by a relatively short length gap 32. The length of gap 32 can be the same as the length of AC erase gap 23 or somewhat shorter. The additional information bearing signals to be recorded on record medium 10 are imposed on head H3 via winding 33 which preferably includes an AC bias signal.

Referring next to FIG. 2, the effect of acquiring additional signals H3 is shown by the curve H3' for a gap 32 length comparable to the erase gap 23 length. From this diagram, it is seen that the magnetic flux penetration into magnetic coating 11 by the recording of the additional signals does not affect the remaining now stabilized recorded "servo" signals.

Initially, it was pointed out that the head H1 gap length could be 5 micrometers. In that case, the length of gaps 23 and 32 are correspondingly shortened for enabling the AC erasure of a shallower portion of the coating on coding 11 and the recording of higher frequency signals than contemplated by the second example.

As seen in FIG. 2, the stabilized first-recorded signals and the subsequent recording of additional signals, respectively indicated by H1' (less the hatched area) and H3', space divides the stabilized signals H1' and the additional signals H3'. This phenomenon is particularly apparent in relatively thick coatings 11, such as that normally found on flexible magnetic media. It should also be noted that without the AC erasure stabilization, several recordings of additional signals tend to erase a surface area of coating 11 after which the first recorded signals become stabilized.

In all of these operations, it is preferred that AC bias recording techniques be employed, no limitation thereto intended. It should also be noted that invention contemplates frequency division multiplexing be employed. That is, a greater gap 16 length recording followed by a shorter gap 32 length recording indicates that signals recorded via head H1 are relatively low frequency signals whereas the additional signals can have higher frequencies. Such a frequency selection works well with the different gap lengths, that is, longer head gaps record deeply into a record medium better than short head gaps. Low frequency recorded signals can be easily sensed even though residing in a deep or lower portion of the record member. Shorter head gaps efficiently record high frequency signals near the record member surface adjacent the head gap without sending recording flux deeply into the record medium; therefore, record high frequency signals without disturbing or affecting deeply recorded first signals. Further, recorded high frequency signals are reproduced or read only from that portion of the record member adjacent the surface facing the sensing gap.

In a best mode, the first signal to be stabilized has a relatively low frequency. Such low frequency first-recorded signals can be used for position indicating signals, i.e., buried servo signals, exhibit several advantages over higher frequency signals, particularly when stabilized in accordance with the present invention. Modulation of the first recorded and stabilized signal can provide track identification as well as angular index indication. Such stabilized signals are relatively immune to media defects and separation variations (head to medium spacing variations). Also because of the relatively low flux change density, a record medium drop out would have to be quite long as well as off center of the recorded track to have a deleterious effect when the low frequency stabilized signal is a position indicating signal. This fact is accented by the stored energy effect in narrow band filters used in servo positioning systems. It should be noted that such a buried servo signal which is recorded substantially in the bottom portion of magnetic coating 11 is already substantially separated from a head gap 32; therefore variations of spacing between head H3 and record medium 10 has a less percentage spacing variation. Also, such spacing variations are less critical at lower frequencies.

Modulating the stabilized first-recorded signal encodes control indicia into the stabilized first-recorded signal facilitating identification of angular index in record storage disks as well as miscellaneous control indicia in all forms of record members. In magnetic tape, such control indicia can identify record block areas. It is preferred that when the stabilized signal is used for position indicating, the stabilized signals be submultiples of a data clock signal. Using such submultiples enables a data clock to be easily driven from the stabilized first recorded signal which then locks the additional signal phase to the "buried servo signal". In this manner, the recording of high frequency data signal, which is normally used to drive a data clock and which is subject to drop out, becomes more reliable enabling continuous synchronization of the data clock with the buried servo signal. Accordingly, rather than requiring resynchronization after a short signal dropout, the well known devastating effects on a clock signal driven by a data signal is avoided. Because the timing and actual position of the data signal is always known, such a continuous clock synchronization enables powerful error correction codes and schemes to be used more effectively for correcting data errors caused by media defects or head separations. Such a servo derived data clock is also used for recording the data signal such that the data is written at a constant density irrespective of speed variations in the transport of a record medium. Subsequently, the same buried servo signals or servo derived data clock is useful for synchronizing reading the additional recorded signals for better accommodating the usual signal dropouts and interblock gaps.

From all of the above, it is seen that the utilization of the stabilized first-recorded signal as a servo position indicating signal avoids constraints on data codes by reducing the need for extra or synchronizing pulses in a data code. For example, pure NRZI recording can be used at high areal densities with a high degree of reliability. Side benefits from such a system is the simplification of the data channel.

The effects of gap length and frequency in a magnetic coating is illustrated in FIGS. 3 through 5, such graphs were calculated but serve to show the general effects and further establish the advantages of the present invention. FIG. 3 illustrates the decrease of write or recording field intensity in oersteds as a function of distance, i.e., penetration into the coating 11, with respect to gap length, as indicated respectively by the curves H1", H2" and H3" respectively for heads H1, H2 and H3. In this instance, H1 has a gap length of about 12.5 micrometers while H2 and H3 have gap lengths of about 0.9 micrometers.

The erasing signal supplied to head H2 has sufficient amplitude and frequency to surface erase coating 11. The erase signal amplitude is preferably sufficiently strong to create a magnetic field in head H2 resulting in a near flux saturation magnetic state. Such field strength and signal amplitude depends entirely on pole piece 21, 22 magnetic material and pole piece sizes. Such near saturation of the pole piece material limits the erasing magnetic field penetration into coating 11 as indicated by H2' in FIG. 2. Later, information-bearing signals applied to head H3 for recording in coating 11 have lesser amplitude as may be optimumly selected for recording such signals, as is well known in the recording arts for recording such information-bearing signals of diverse types. When H3 is designed to have a lesser magnetic effect on coating 11 that H2, then even circuit malfunctions resulting in possible undesirable recording signals in head H3 will have no degrading effect on the stabilized control signal represented by H1' in FIG. 2. The erasure stabilization then has a greater magnetic effect on coating 11 than any subsequent intentional or unintentional recording.

Notice the steep slope of field strength from heads H2 and H3 as compared to H1. The limited penetration of magnetic fields from heads H2 and H3 into coating 11 and the relatively sharp demarcation of such limited field penetration (lines H2' and H3' of FIG. 2) is important to high quality stabilization of the H1 recorded control signal. Any magnetic fields in coating 11 from heads H2, H3 decrease rapidly with depth from the surface of coating 11 and proceeding toward substrate 12 effectively guaranteeing no disturbance nor degradation of the control signal remanence residing in coating 11 near substrate 12 (see line H1' in FIG. 2).

Additionally, the amplitude of the read back signal is a function of the separation of the sensing gap and the record medium, including the distance in the coating 11 of the record medium. Such separation loss is known as the Wallace separation loss effect. FIG. 4 illustrates these weighting factors for the H1 signal at a relatively low frequency and the H3 signal at a relatively high frequency. The FIG. 4 graph illustrates that the H3 recorded signal readback amplitude receives a primary contribution from the upper surface portion of magnetic coating 11 (that portion of coating 11 remote from substrate 12). Also, the H1 recorded signal before being stabilized provides a surface contribution as well. However, if erased, as to point K, substantial magnetic flux is still applied to the sensing transducer; that is, most of the H1 signal is derived from a lower portion of magnetic coating 11; i.e., that portion adjacent substrate 12. Therefore, by using the different gap lengths for different functions, a method and apparatus has been described for separating the stabilized signal and additional signals into non-interfering layers (space distribution multiplexing) in magnetic coating 11 so that substantially no interaction, including erasure or other degradation occurs.

Combining the graphs in FIGS. 2 and 4, the amplitude contribution to the read back signal is illustrated in FIG. 5 as a function of depth of recording in the magnetic coating 11. Solid line 30 represents the signal readback of the additional or data signal; line 31 represents the initial read back signal (before surface erasure) of the stabilized or servo signal while the dash line 32 indicates the read back amplitude of a surface erased servo or stabilized signal. The upper portion 33 of lines 31 and 32 are coincident indicating no erasure of the deep or hard recorded portion of the stabilized servo signal.

It should also be borne in mind that various particles within coating 11 may have higher coercivity than other particles. These higher coercivity particles may be anywhere in coating 11. Therefore, there may be some minor contributions to the stabilized servo signal from such ultra high coercivity particles adjacent surface 11A which are not erased by the recording of the data signals via H3. However, the major effect is the penetration of the magnetic coating. The calculations for FIGS. 3-5 assumed a substantially homogeneous magnetic coating 11. In a practical magnetic coating, there usually will be some point-to-point variations in magnetic properties. Such variations have but a minor effect.

Figure 6:
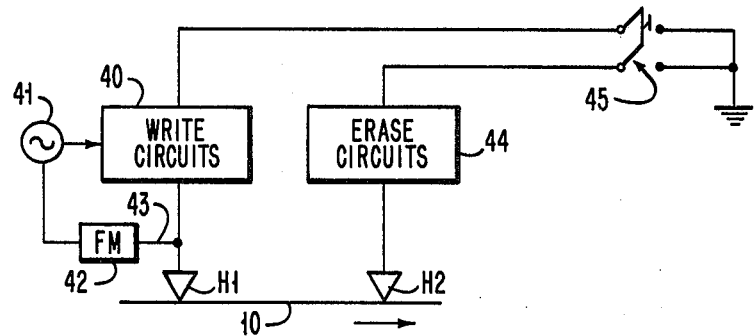

FIG. 6 is a diagrammatic showing of a preferred recording setup for practicing the present invention. Write circuits 40 are connected to a head H1 for recording the signals to be stabilized on record medium 10. Circuits 40 are timed by an oscillator 41 which also supplies a signal to frequency multiplier 42 for supplying an ac bias to H1 over line 43. Write circuits 40 include any modulation or tone generating circuits that may be desired for angular index indication or track identification. An AC erase 44 provides an AC erase signal to H2 for surface erasing medium 10 immediately after receiving the signals to be stabilized from H1. A control switch 45 enables both circuits 40 and 44 to operate with respect to medium 10. Medium 10 is transported in any usual recorder, either of the disk or the tape type.

Figure 7:
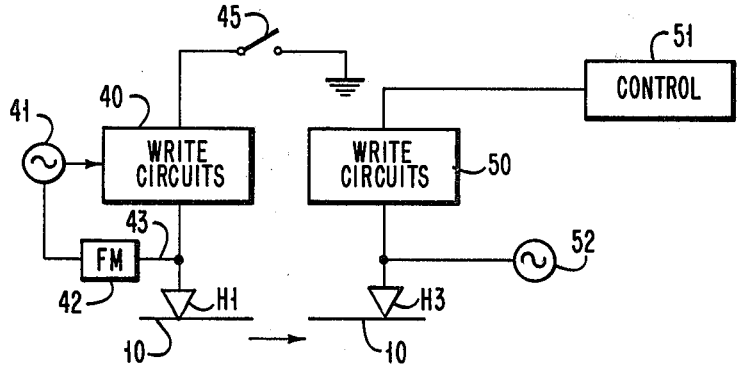

FIG. 7 diagrammatically illustrates a secondarily preferred methodology of the present invention in which the H1 signals are generated as shown in FIG. 6. The erase circuit 44 and head H2 are eliminated. In a separate recorder, write circuit 50 of any selective design for recording additional signals via H3 is operated under supervision of control 51 which is also of usual recording channel or recorder control design. Oscillator 52 supplies AC bias to H3 for linearizing the recording of the additional signals supplied by write circuit 50.

FIG. 8 illustrates the utilization of the invention in which the record medium 10 receives the signals to be stabilized via a head H1 as shown in FIG. 7, but without erasure. In a separate unit 56-58 AC erase circuit 55 is actuated by recorder control 56 to supply AC erasing signals to head H2. Simultaneously, control 56 actuates read/write circuit 57 to record additional signals through head H3. In the event that the signals are to be sensed by H3, then control 56 in a so-called "read" mode disables erase circuit 55 and enables H3 to supply sensed signals through R/W circuit 57 to suitable detection circuits 58. In this manner, all recording is preceded by an ac erasure for dispensing with the requirements associated with recording signals using overwriting without erasure. In this regard, it should be noted that the timing indication provided by the stabilized signal in the bottom portion of coating 11 of medium 10 enables control 56 to precisely time AC erasure 55 as well as R/W circuit 57. This precise control enables update in place on magnetic tapes as well as disks while using AC erasure. For example, as a conservative approach two servo signal cycles can be left blank between adjacent blocks of data. This allows a two cycle timing error and ensures no inadvertent erasure of previously recorded data signals.

The control of read/write (RW) circuits is illustrated in FIG. 9. Head H3 is a read/write head connected to both write circuit 60 and read circuit 61. Oscillator 62 provides an AC bias to write circuit 60 for linearizing recording of the additional signals. Read circuit 61 includes two portions for sensing the servo signal.

A first portion has a low pass filter (not shown) for passing the sensed servo signals to detector 64 which supplies timing signals to write circuit 60 and read circuit 61 via line 65. When recorder control 66, of usual design, actuates switch 67 to the record mode by moving the diagrammatically illustrated switch arm of switch 67 to line 68, write circuit 60 is enabled and timed by the detected servo signal on line 65. The control 66 can move the switch arm of switch 67 to line 69 for actuating read circuit 61 to pass data signals over line 70 via a band pass filter (not shown) in read circuit 61. It should be noted that in the FIG. 9 diagrammatic illustration, detector 64 detects the read back of the stabilized servo signal during both recording and reproducing operations; that is, during recording operations when write circuit 60 is active, head H3 not only supplies signals to be recorded to record medium 10 but also senses the previously recorded stabilized servo signals for supplying same through read circuit 61 to detector 64. Such simultaneous operation is believed to be greatly enhanced by ac bias recording via write circuit 60 and of using a so-called bias pulse write technique as described in the commonly-assigned concurrently-filed application, Haynes Ser. No. 101,350 filed 12/7/79.

FIG. 10 illustrates the recording in a disk recorder of the stabilized servo signals to be used as position indicating signals; position indicating including radial position for track following and seeking as well as indicating angular index and precise angular timing. A record disk 80 is mounted in a servo writer 81 which includes a drive spindle indicated by axis point 82 on which a precise tachometer disk T is mounted for corotation and angular index indication. Sensor 83 supplies tachometer (rotation position indicating) signals to servo write circuits 84. Precise radial position of dual gap head H1, H2 is achieved by voice coil motor (VCM) under control of position circuit 85. Position circuits 85 are coupled to a linear transducer sensor 86 which electrically indicates the precise radial position of H1, H2 when actuated by a voice coil motor VCM. Position circuits 85 very closely control VCM as indicated by a dotted line 87. Radial motion is indicated by a double headed arrow 88. Additionally, write circuits 84 exchange control signals with position circuits 85 using known servo writing techniques. Write circuits 84, based upon the tachometer T signals sensed by sensor 83, synchronously supply servo signals to be stabilized to the H1 gap over line 89 and simultaneously supply AC surface erasing signals over line 90 to head H2. The actual radial position of heads H1, H2 as sensed by sensor 86 and supplied to position circuits 85 is also transmitted to write circuits 84 for enabling suitable encoding the servo signal using known frequency or phase modulation techniques. Such modulation provides an angular index indicator for providing a fiducial mark in each and every one of the concentric tracks being identified on disk 80. Double dash radial lines 92 indicate a radial location of such angular index indicator.

If the servo position signals to be stabilized have 0.4 flux changes per millimeter, then the angular index indicator may have 20 flux changes per millimeter, i.e., twice the recorded wavelength as the servo signal. In fact, the angular index indicator can consist of 4 successive long wavelengths at the double radial lines 92 or other modulation of this signal. Additionally, disk 80 sectors can be indicated by one or two of such long wavelengths at the sector lines 93 which are preferably evenly circumferentially distributed around the circumference of disk 80, no limitation thereto intended.

Additionally, at each sector line 93, a series of coded tones or frequency modulations 92, 92L, 94, 94T can be employed for indicating the track address using either Gray code or straight binary or some other form of code for indicating track address. By embedding the track address in the stabilized signal, a higher degree of reliability for addressing and operating a disk recorder employing a disk 80 is achieved.

While the invention has been particularly shown and described with reference to preferred embodiments thereof, it will be understood by those skilled in the art that various changes in form and details may be made therein without departing from the spirit and scope of the invention.

What is claimed is:

1. The method of magnetically recording signals in a magnetic record member and for stabilizing such recorded signals, said record member having a unitary magnetic layer, the steps of:

recording a first signal in said magnetic layer using a first transducer by relatively moving said layer and transducer such that said gap scans a given track to record said first signal therein, said first transducer having a given extended gap length and having pole pieces exhibiting high magnetic saturation equal to or greater than the permeability of mu metal, and AC erasing said magnetic layer along said given track using a second transducer having a given gap length less than said extended gap length thereby partially surface erasing said first signal recorded in said given track to thereby stabilize same for later plural successive magnetic recording operations along said given track and using gap lengths in third transducers less than said extended gap length and selecting said second and third transducers to have lower pole tip magnetic saturation than said first transducer whereby the later magnetic recording operations along said given track do not partially further erase said recorded first signal.

2. A magnetic record member bearing said first signal recorded in accordance with the method set forth in claim 1.

3. The method set forth in claim 1 including AC erasing said layer after recording said first signal with said second transducer while operating said second transducer in a near magnetic saturation state to effect a surface erasure of said first signal.

* * * * *